United States Patent
Maheshwari et al.

(10) Patent No.: US 8,321,651 B2
(45) Date of Patent: Nov. 27, 2012

(54) SYSTEM AND METHOD FOR MEMORY ALLOCATION IN EMBEDDED OR WIRELESS COMMUNICATION SYSTEMS

(75) Inventors: Shailesh Maheshwari, San Diego, CA (US); Thomas Klingenbrunn, San Diego, CA (US); Vanitha Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 12/416,759

(22) Filed: Apr. 1, 2009

(65) Prior Publication Data
US 2009/0254731 A1    Oct. 8, 2009

Related U.S. Application Data

(60) Provisional application No. 61/041,878, filed on Apr. 2, 2008.

(51) Int. Cl.
G06F 12/02 (2006.01)
G06F 12/00 (2006.01)

(52) U.S. Cl. ........... 711/171; 711/170; 711/E12.001; 711/E12.002

(58) Field of Classification Search .......... 711/170, 711/171, 173
See application file for complete search history.

(56) References Cited

U.S. PATENT DOCUMENTS

| | | | |
|---|---|---|---|
| 5,715,430 A * | 2/1998 | Hirayama | 711/141 |
| 7,433,673 B1 | 10/2008 | Everson et al. | |
| 7,770,177 B2 | 8/2010 | Togawa | |
| 2004/0057434 A1 | 3/2004 | Poon et al. | |
| 2005/0125550 A1 | 6/2005 | Bajikar | |
| 2006/0015651 A1 | 1/2006 | Freimuth et al. | |
| 2006/0159071 A1 | 7/2006 | Monteiro | |
| 2006/0268868 A1 * | 11/2006 | Han et al. | 370/390 |
| 2007/0230493 A1 | 10/2007 | Dravida et al. | |
| 2008/0222380 A1 * | 9/2008 | Sze et al. | 711/170 |

FOREIGN PATENT DOCUMENTS

| | | |
|---|---|---|
| RU | 2037874 C1 | 6/1995 |
| RU | 2006118342 A | 12/2007 |
| WO | WO2004099954 A1 | 11/2004 |

OTHER PUBLICATIONS

International Search Report and Written Opinion—PCT/US2009/039243, International Search Authority—European Patent Office—Jun. 8, 2009.

Abbott, N.: "Alternatives for Providing Routing and Location Information to Support Emergency Calling from IP Enterprises", NENA Technical Information Document, pp. 1-16, XP002323684 (Oct. 3, 2003).

International Search Report and Written Opinion—PCT/US2010/045495, International Search Authority—European Patent Office—Nov. 5, 2010 (090332).

Polk J Schnizlein M Linsner Cisco Systems J : "Location Configuration Information for GEOPRIV Dynamic Host Configuration Protocol Option for ; draft-ietf-geopri v-dhcp-1ci-opti o n-02.txt" IETF Standard-Working-Draft, Internet Engineering Task Force, IETF, Ch, Vol . geopriv, No. 2, Aug. 21, 2003, XP015001903 ISSN: 0000-0004 the whole document.

* cited by examiner

Primary Examiner — Hoai V Ho
Assistant Examiner — Tri Hoang
(74) Attorney, Agent, or Firm — Jeffrey D. Jacobs

(57) ABSTRACT

Systems and methods for an improved memory allocation service in embedded or wireless devices. Memory is allocated using a combination of container memory items and referencing memory items.

26 Claims, 7 Drawing Sheets

SYSTEM AND METHOD FOR MEMORY ALLOCATION IN EMBEDDED OR WIRELESS COMMUNICATION SYSTEMS

CROSS-REFERENCE TO RELATED APPLICATIONS

This application claims the benefit of U.S. Provisional Patent Application No. 61/041,878, filed Apr. 2, 2008, entitled MEMORY ALLOCATION SCHEME FOR EMBEDDED OR WIRELESS COMMUNICATION SYSTEMS. This application is incorporated by reference in its entirety.

BACKGROUND

1. Field of the Invention

This field relates generally to memory allocation, and more specifically, to memory allocation in embedded or wireless communication systems 2. Description of the Related Art Memory allocation services make use of pools of memory items. In some cases, memory items are sorted into different pools based on the size of the memory item. For example, one pool might consist of many small memory items while another pool might consist of relatively few large memory items. In response to memory allocation requests, an appropriate data item may be selected from a particular pool and returned to the requesting entity. This system results in significant wasted memory and processor resources. For example, with small memory items, the ratio of header to payload is high resulting in inefficient use of memory. Further, when entire memory items are allocated, significant data portions of any particular data item may go unused. Also, in these allocation services, no statistical multiplexing is available. Processor resources are also consumed due to the chaining of multiple small memory items.

In wireless communication systems, packets are often segmented into small fixed size "radio link" packets, for example 40 bytes, to ensure reliable radio transmission. In order to use memory efficiently, one approach is to create a large pool of relatively small memory items, each holding a 40 byte block, which eventually may be chained together at the higher layers to form larger data blocks (e.g. 1500 byte IP packets). One disadvantage of this service is that some space may be wasted because the memory items may have to be cache row aligned (32 or 64 byte), which may not fit the small radio link packet size. Also, different technologies may share the same memory item pool to reduce to overall memory, in which case the memory item payload size must be chosen to fit the largest radio link packet size which can further increase wastage.

SUMMARY OF THE INVENTION

In one embodiment, a system provides for memory management is provided. The system comprising a processor and a memory management service which is executable on the processor. The memory management service configurable to generate first memory items, wherein each of the first memory items comprises a header and a payload, the payload configurable to store a plurality of independently allocatable memory chunks, the header of the first memory items referencing allocatable space in the payload, generate second memory items, wherein each of the second memory items comprises a header referencing one or more memory chunks in the payload of the first memory items, and return a reference from either the header of a first or second memory item responsive to a memory allocation request.

In another embodiment, a method for memory management is provided. The method comprises allocating first memory items, the first memory items each comprising a first header and a payload, the payload comprising chunks of independently allocatable memory, the first header comprising a reference to unallocated memory in the payload allocating second memory items, the second memory items each comprising a second header, the second header comprising a reference to an allocated chunk of memory in the payload of a first memory item, receiving requests for memory allocation, and responding to requests for memory allocation by returning a reference from the header of a first or second memory item.

In another embodiment, a memory management system is provided. The system comprises means for allocating first memory items, the first memory items each comprising a first header and a payload, the payload comprising chunks of independently allocatable memory, the first header comprising a reference to unallocated memory in the payload, means for allocating second memory items, the second memory items each comprising a second header, the second header comprising a reference to an allocated chunk of memory in the payload of a first memory item, means for receiving requests for memory allocation, and means for responding to requests for memory allocation by returning a reference from the header of a first or second memory item.

In another embodiment, a computer readable medium encoded with computer instructions is provided. The instruction, when executed, cause a processor to allocate first memory items, the first memory items each comprising a first header and a payload, the payload comprising chunks of independently allocatable memory, the first header comprising a reference to unallocated memory in the payload, allocate second memory items, the second memory items each comprising a second header, the second header comprising a reference to an allocated chunk of memory in the payload of a first memory item, receive requests for memory allocation, and respond to requests for memory allocation by returning a reference from the header of a first or second memory item.

DETAILED DESCRIPTION OF THE PREFERRED EMBODIMENT

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Mobile devices typically make use of memory allocation services in order to operate. Methods and devices are described herein to decrease the total amount of memory required by various subsystems in a mobile device and to decrease the processing resources consumed by the mobile device. Set forth below are some architectures that may be used in conjunction with the described methods and devices.

Figure 1:
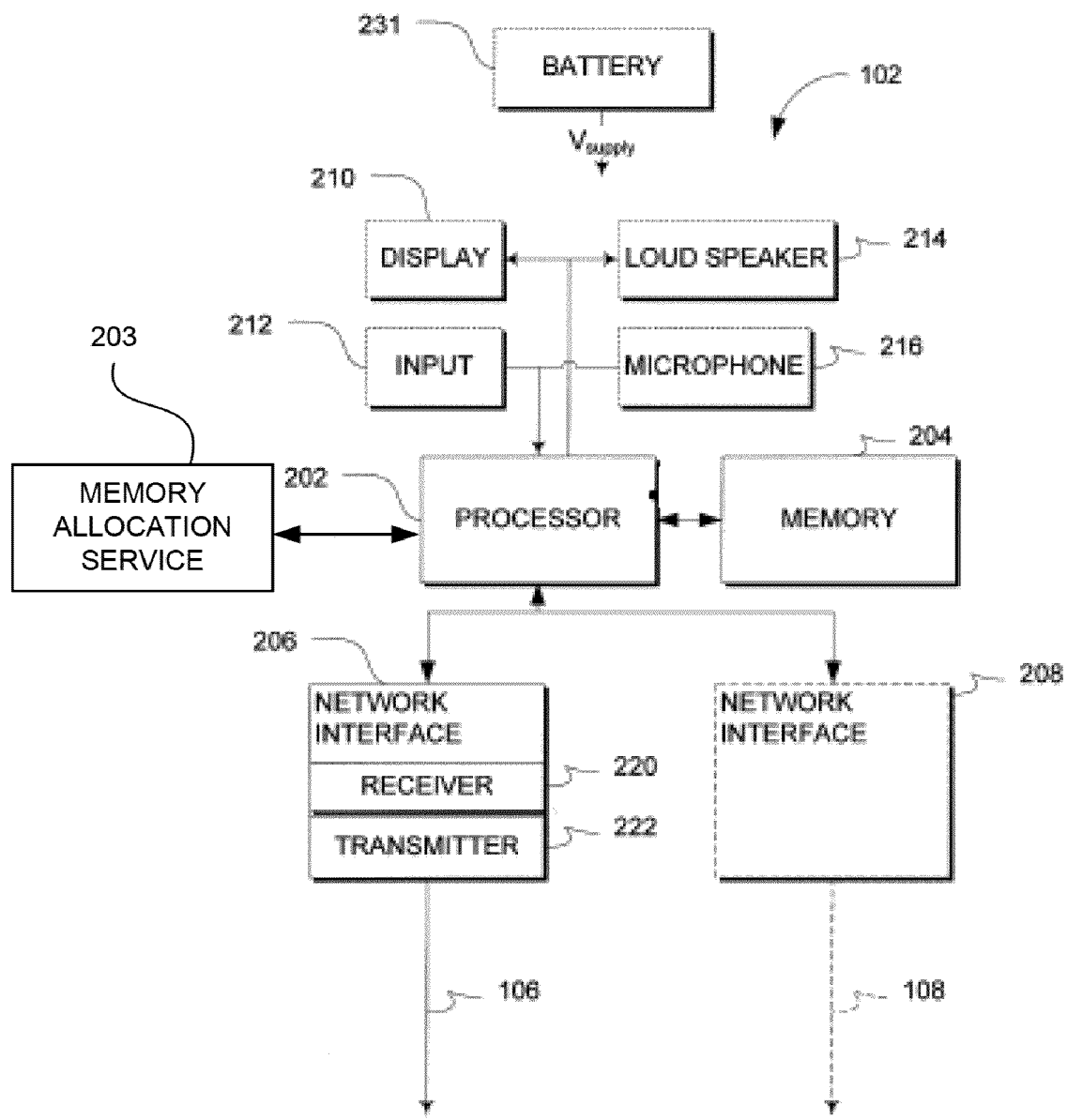
FIG. 1 is a block diagram illustrating an example of a mobile device.

FIG. 1 is a block diagram illustrating an example of a mobile device 102. The device 102 includes a processor 202 that is in communication with a memory 204 and a network interface 206 for communicating via the wireless link 106. Optionally, the device 102 may also include one or more of a display 210, a user input device 212 such as a key, touch screen, or other suitable tactile input device, a loudspeaker 214 comprising a transducer adapted to provide audible output based on a signal received over the wireless link 106 and/or a microphone 216 comprising a transducer adapted to provide audible input of a signal that may be transmitted over the wireless link 106. For example, a phone may include the display 210 adapted to provide a visual output of a graphical user interface (GUI).

The network interface 206 may include any suitable antenna (not shown), a receiver 220, and a transmitter 222 so that the exemplary device 102 can communicate with one or more devices over the wireless link 106. Optionally, the network interface 206 may also have processing capabilities to reduce processing requirements of the processor 202.

Optionally, the device 102 may include a second network interface 208 that communicates over the network 110 via a link 108. For example, the device 102 may provide connectivity to the other network 110 (e.g., a wide area network such as the Internet) via a wired or wireless communication link. Accordingly, the device 102 may enable other devices 102 (e.g., a Wi-Fi station) to access the other network 110. In addition, it should be appreciated that one or more of the devices 102 may be portable or, in some cases, relatively non-portable. The second network interface 208 may transmit and receive RF signals according to the IEEE 802.11 standard, including IEEE 802.11(a), (b), or (g), the BLUETOOTH standard, and/or CDMA, GSM, AMPS or other known signals that are used to communicate within a wireless cell phone network. In addition, the second network interface 208 may comprise any suitable wired network interface such as Ethernet (IEEE 802.3), USB, or MDDI.

The device 102 may include a battery 231 to provide power to one or more components of the device 102. The device 102 may comprise at least one of a phone, smartphone, Personal Digital Assistant (PDA), Ultra-Mobile Personal Computer (UMPC), Mobile Internet Device (MID), or any other mobile device. In particular, the teachings herein may be incorporated into (e.g., implemented within or performed by) a variety of the devices 102.

The components described herein may be implemented in a variety of ways. Referring to FIG. 1, the device or apparatus 102 is represented as a series of interrelated functional blocks that may represent functions implemented by, for example the processor 202, software, some combination thereof, or in some other manner as taught herein. For example, the processor 202 may facilitate user input via the input devices 212. Further, the transmitter 222 may comprise a processor for transmitting that provides various functionalities relating to transmitting information to another device 102. The receiver 220 may comprises a processor for receiving that provides various functionality relating to receiving information from another device 102 as taught herein.

Processor 202 is also in communication with memory allocation service 203. In one embodiment, memory allocation service 203 runs on processor 202. memory allocation service 203 responds to requests for memory from one or more subsystems operating in device 102. The method and operation of memory allocation service 203 will be described in greater detail here below.

As noted above, FIG. 1 illustrates that in some aspects these components may be implemented via appropriate processor components. These processor components may in some aspects be implemented, at least in part, using structure as taught herein. In some aspects, a processor may be adapted to implement a portion or all of the functionality of one or more of these components. In some aspects one or more of the components represented by dashed boxes are optional.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In accordance with one aspect of the memory allocation service, small memory blocks are packed into a larger fixed size units (called "DSM items"). Each of the smaller blocks is kept track of using "DUP" (duplicate) items, which point to the payload within a DSM. Since the DSM items are of limited size, and all blocks within the DSM can be assumed to have similar limited lifetime, it is not necessary to deal with fragmentation of free memory within each DSM. The benefit of this is that memory utilization can be greatly reduced since only little memory within each DSM is wasted, but at a fraction of the complexity of other memory allocation techniques with high packing efficiency. Another way of looking at this is that this is a hybrid of fixed and flexible size allocation services, where overall the memory is allocated in fixed size blocks, but within the blocks, flexible size allocations are allowed because the flexible allocations are expected to have short lifetime.

In one aspect, the fundamental memory block is called a DSM item. In is comprised of a header and a payload section. When a block of data has to be stored in memory, a new DSM item is allocated, and the data is copied to the payload section of the DSM. Additionally, the headers are updated to reflect the start and length of the data. If the length of the data exceeds the size of the payload section, multiple DSM items may be chained together into a linked list.

Further, a special type of DSM item is defined, denoted as DUP ("duplicate"). A DUP uses the same header structure as a regular DSM, but has no payload section of its own. Instead, it can point to a data section elsewhere, for example inside a normal DSM. In order to track how many DUPs point to data in the same DSM item, there is a header field denoted "ref_count", which counts the number of references to this DSM item and which is set to one when the original DSM is first allocated. Every time a new DUP is created pointing inside the DSM item, the ref_count of the DSM item is increased. Likewise, when the DUP is freed up, the ref_count of the original DSM item is decreased. This way, the allocation algorithm can know when the DSM item can actually be freed, which is only when no other DUPs point to the payload section of this packet, which is when the ref_count has gone back to zero.

The DUPs can be used to split packets, to reorder data, to remove headers, etc., without having to touch the original data. All this can be achieved just by manipulating the DSM and DUP headers.

According to another aspect, techniques to allow packing of data into the same DSM item to improve memory efficiency can address some of the disadvantages noted previously. According to this aspect, a pool of large DSM items is defined. A large DSM size would allow data from multiple radio link packets to be concatenated into the same DSM item.

Figure 2:
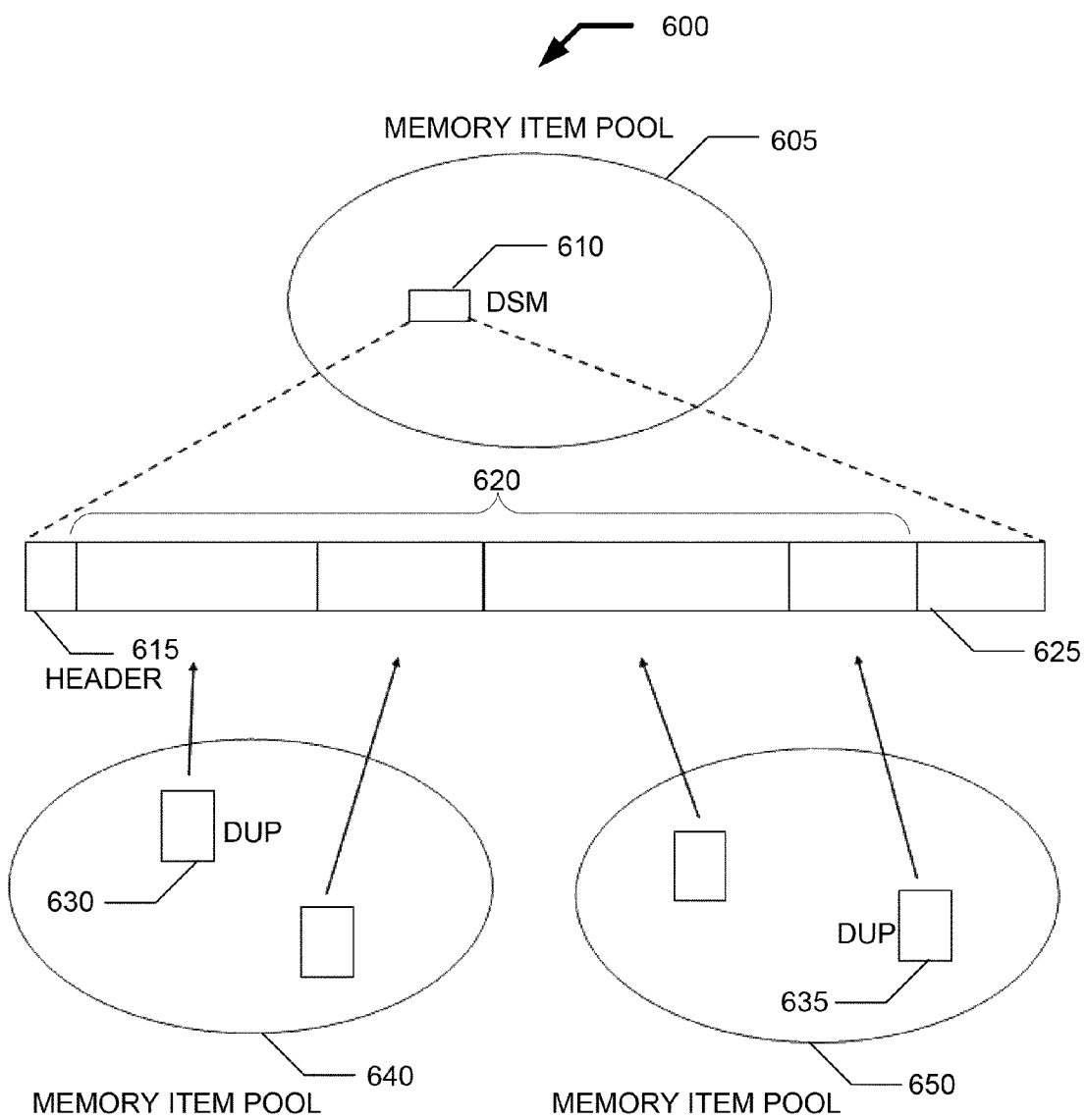
FIG. 2 is a block diagram illustrating an example of memory items.

FIG. 2 is a block diagram illustrating memory items for a memory allocation service. The memory allocation service may include and application programming interface ("API"). This API may be available for access by subsystems such as subsystems present in device 102. This memory allocation service may be executed in whole or part by processor 202 or other similar processing device. Further, the API may form part of an operating system for a mobile or wireless device such as device 102. Alternatively, the API may form part of a software library. In FIG. 2, a first type of memory item 610 is shown. This first type of memory item 610 may be referred to as a data services management ("DSM") item. Alternatively, it may be referred to as a container item. These container type memory items 610 are organized as a pool of memory items 605. While a single pool 605 is illustrated, it will be appreciated that multiple pools of DSM items may also be used. Each pool may be characterized by one or more common characteristic such as item size or subsystem served by the pool.

An expanded view of memory item 610 is also provided in FIG. 2. As seen in the expanded view, these container type items 610 comprise multiple sections. A first section of the memory item may be referred to as the header 615. The header 615 may contain information relating to the remaining portions of the memory item 610 as well as other information. A second section of the memory item 610 may be referred to as the payload. The payload itself may have several allocated portions or blocks of memory 620. In addition the payload may have unallocated or unused space 625. In one embodiment, the payload comprises approximately 1500 bytes, about the size needed to store an IP packet.

The header 615 of the memory item 610 may comprise information such as a reference to the unallocated space 625 in the memory item 610. In one example, this reference takes the form of a pointer indicating the start address of the unallocated space 625 in the memory item 610. This reference to the unallocated memory 625 in data item 610 may also be referred to as "data_ptr." The header may also contain a field indicating the size of allocated memory 620. This quantity of allocated space may be referred to as a "used" space in the payload. The header may also contain a field indicating an identifier identifying the memory pool 605 associated with the memory item 610. This identifier may be referred to as a "pool_id." The header may also contain a field indicating the number of references to the memory item 610. For example, as described below, the memory item 610 may be referenced by other memory items. For example, each of the allocated chunks 620 of the payload is referenced by a different memory item. Further, the header 615 of the memory item 610 references the unallocated portion 625 of the payload. A count of these references may be used, inter alia, for the purpose of determining when the memory item 610 may be freed up and returned to the pool 605 to be subsequently reallocated. This reference count may be referred to as "references". The header 615 may also contain one or more references to other memory items. For example, if a requested chunk of memory is too big to fit in a single memory item 610, the references in the header may be used to indicate one or more additional memory items that may be chained together to meet the request. Depending on the type of memory items being referenced, these references may be referred to as "pkt_ptr" or "dup_ptr." For example, pkt_ptr may reference zero or more DSM or container items while dup_ptr may reference zero or more DUP items. In addition to the identified fields, the header 615 may comprise additional fields such as user defined field or fields used for testing purposes. In addition, the header 615 may omit one or more of the identified fields.

FIG. 2 also illustrates a second type of memory item 630. This second type of memory item may be referred to as a duplicate or "DUP" memory item. These DUP items 630 comprise a header similar to the header 615 of container memory items 610. For example, DUP items may have the same fields as DSM item header 615. Alternatively, DUP items may have more or less fields. However, these DUP items do not have their own payload. Rather, the DUP item headers 630 contain references to container memory items. In one particular example, DUP item 630 contains a pointer indicating the first allocate memory block in the allocated portion 620 of memory item 610. These DUP items 630 may also be arranged into one or more pools 640. Like pools 605 of container items, multiple DUP item pools may be used. For example, FIG. 2 illustrates two DUP item pools 640 and 650. In one example, each subsystem in an embedded device or wireless communication device has its own pool of DUP items. In this embodiment, pool 640 may correspond to one particular subsystem while pool 650 may correspond to another subsystem. As seen in FIG. 2, one embodiment provides that DUP items from separate pools may reference blocks of memory 620 in a single DSM item 610.

Figure 3:
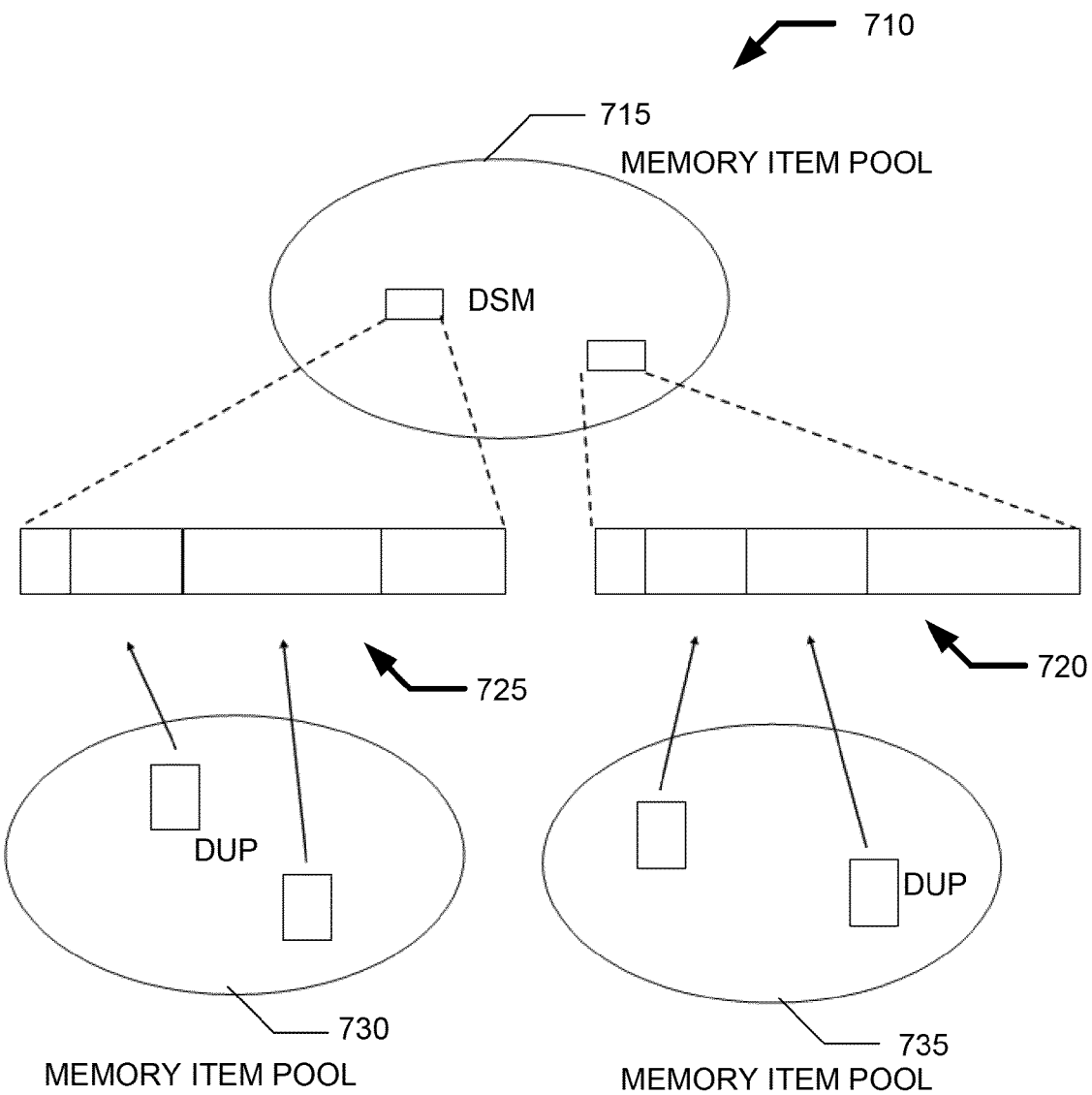
FIG. 3 is a block diagram illustrating another example of memory items.

FIG. 3 shows an alternative embodiment of the memory items illustrated in FIG. 2. Like before, a single pool of DSM items 715 may be used. However, this time, each pool of DUP items 730 and 735 respectively reference allocated portions of different DSM items 725 and 720. As described above, DSM items may be returned to the DSM pool 715 for reallocation once all references to the payload have been freed. However, when multiple subsystems are permitted to have DUP references into the same DSM item, fragmentation may occur. For example, all the memory allocated to a first subsystem in a particular DSM may have already been freed. However, if a small block is still referenced by a DUP from another subsystem, the remaining memory in the payload may have to wait to be freed until the second subsystem frees its small memory block. To minimize this problem, each subsystem may have its own DUP references into its own DSMs. This way, the life times of allocated memory portions in a particular DSM are more likely to be the same. The similarity in life times results in reduced fragmentation.

Figure 4A:
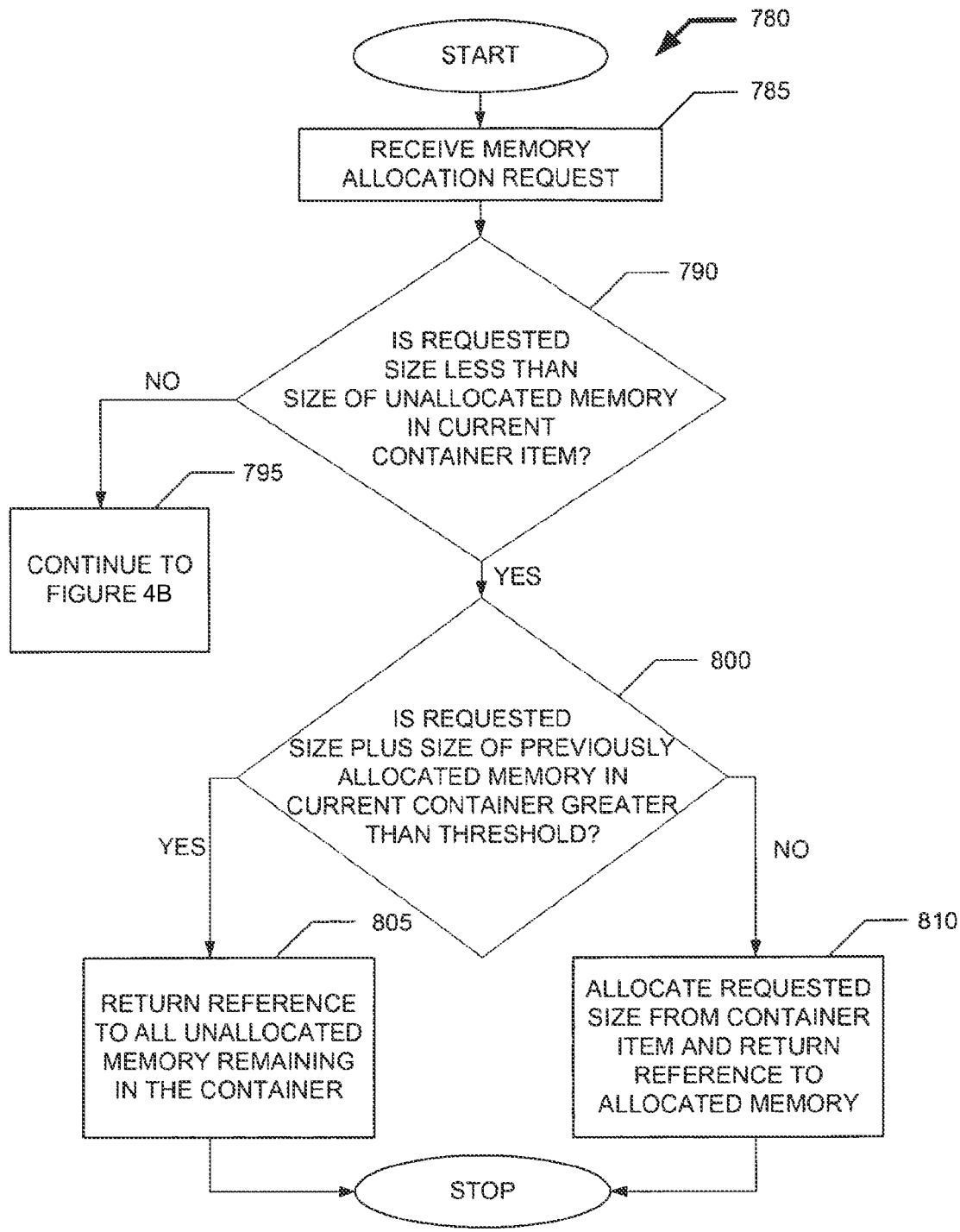
FIGS. 4A and 4B are a block diagram illustrating an example of a method for allocating memory.
Figure 4B:
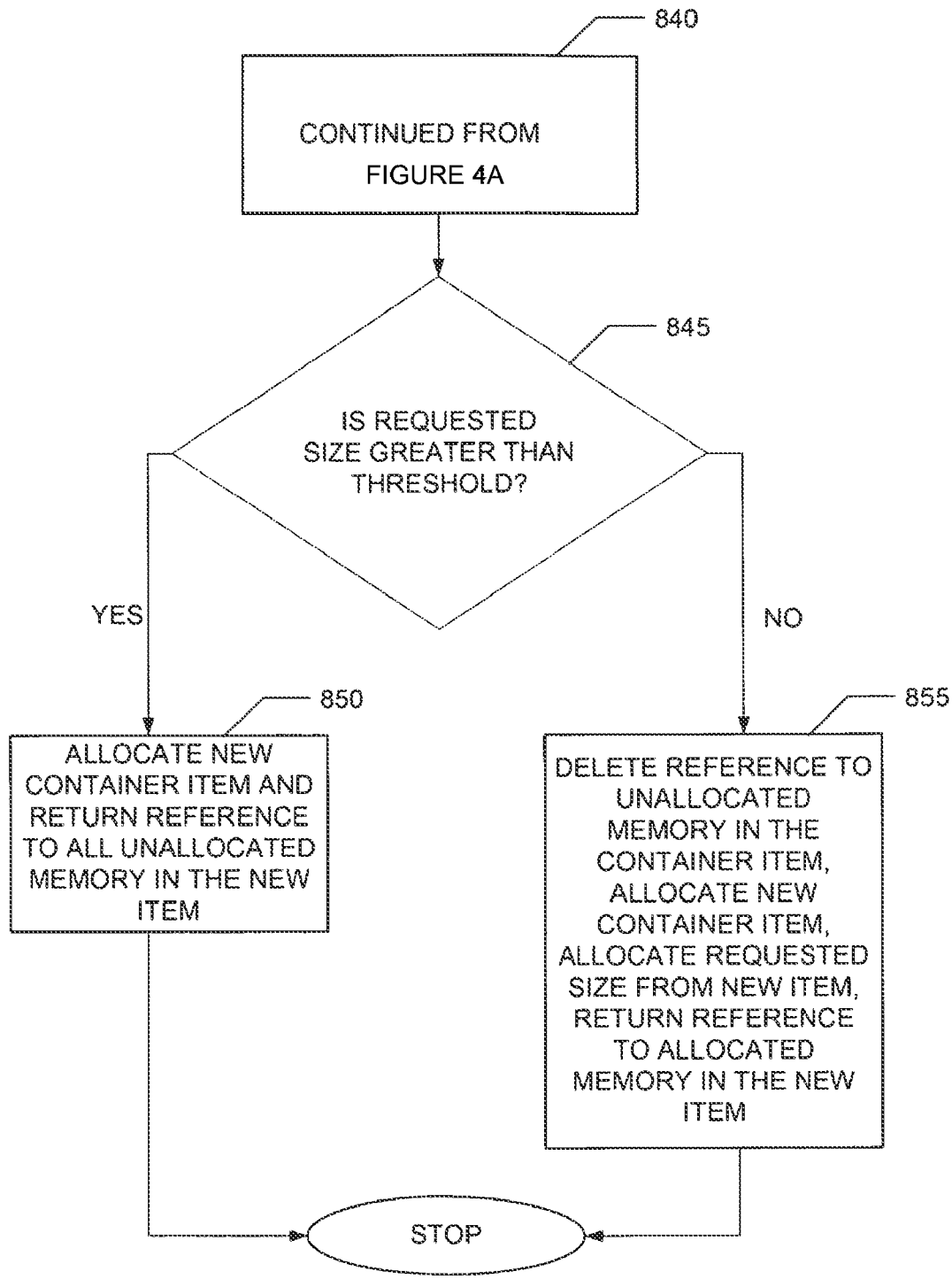

FIGS. 4A and 4B illustrate an embodiment of a method 780 for allocating memory. This method 780 may be executed as a service running on a processor such as processor 202. The method 780 facilitates the reception of memory allocation requests and the return of references to allocated memory. As described below, the particular reference assigned may be a function of the current memory allocation situation for the requesting subsystem and the size of the requested memory block. It is noted that some of the steps can be omitted to suit the requirements or specification of a particular application. It is further noted that some of the steps described herein are optimizations and thus, can be selectively utilized or omitted at the discretion of the designer of the system.

Method 780 begins when a memory allocation service receives a memory request at step 785. As part of the memory request, the requesting subsystem may specify a requested size of memory. The requesting subsystem may also supply a subsystem ID so that the memory allocating service can select an appropriate DSM item for that subsystem. After receiving the memory request, the memory allocation service determines if the requested size is less that the size of the unallocated memory in a current DSM container item as shown in decision step 790. As discussed with respect to FIGS. 2 and 3, DSM items may have unallocated space in the payload section. Decision step 790 may be performed by comparing the size of the unallocated portion to the requested size. Alternatively, since the total size of the payload is known, the requested amount may be compared to the size of the allocated portion of the payload. In another embodiment, rather than using the requested size of memory for the comparison, the memory allocation system may increase the size of the request so that the augmented request is aligned with the cache boundaries. For instance, an actual request may be increased so that the resulting request is a multiple of a particular cache row size such as 16, 32, 64, or 128 bytes. Regardless, if the requested memory size, or its augmented aligned version, fits in the unallocated portion, the method proceeds to step 800.

Continuing to decision step 800, the memory allocation system determines if the requested size plus the size of the previously allocated portion of the current DSM item is greater than a first threshold. For example, if a DSM payload is approximately 1500 bytes long, the threshold might be 1200 bytes. Accordingly, the memory allocation system would determine if the size of the already allocated memory plus the size of the requested memory exceeds the 1200 byte limit. In one embodiment, the threshold may be selected as a certain percentage of the size of the payload of a DSM item. For example, the threshold may be approximately 70%-80% of the size of the payload. In another embodiment, the threshold size may be chosen to reflect the size characteristics of common request such as requests for memory to store IP packets. In another embodiment, rather than comparing the size of allocated memory to a threshold, the size of remaining unallocated memory can be compared to a threshold. In this embodiment, the service would calculate the portion of the payload which would remain unallocated if the requested or adjusted memory size were allocated. The comparison of the remaining unallocated memory to this threshold could then be used in a manner similar to the previously discussed comparison of the allocated memory to a threshold.

Performing the decision step 800, if the identified sum is greater than the threshold, the method proceeds to step 805. Proceeding at step 805, the memory allocation system returns a reference to the requesting subsystem. In one embodiment, the returned reference is the data_ptr from the header of the current DSM item. Advantageously, by returning the reference from the header of the DSM item, the memory allocation system saves the overhead and resources involved in creating a DUP item and returning the reference from the DUP header. Further, allocating the remainder of the DSM payload rather than just the requested size allows the memory allocation service to avoid small blocks of data at the end of payloads which would otherwise result in chaining if used.

Returning to step decision 800, if the requested memory size plus the already allocated memory size is not greater than the threshold, the method proceeds to step 810. In step 810 the memory allocation service creates a DUP item, allocates the requested memory, and returns the reference in the DUP to the requesting subsystem. Advantageously, over multiple iterations, this method allows the memory allocation service to pack multiple allocations into a single DSM item. This packing allows for efficient use of memory resources and provides gain in both memory use and processing use.

Returning to step 790, if the requested memory size is greater than the unallocated space in the current DSM item, the method continues on to decision step 845 of FIG. 4B. In step decision 845, the memory allocation service determines if the requested size is greater than a second threshold. This second threshold, like the first may be set as a fixed number of bytes. For example, if the size of the DSM item payload is 1600 bytes, the second threshold may be 1200 bytes. Alternatively, the second threshold may also be determined as a percentage of the size of the payload. For example, the second threshold may be 65%-75% of the payload size. In another embodiment, the threshold may be dynamically determined. For example, the threshold may be set equal to the total amount of allocated memory in the DSM item. In this embodiment the requested size would exceed the threshold when the requested size exceeds the allocated space in the DSM. Regardless of how the threshold is determined, if the requested size is greater than this threshold, the memory allocation service allocates a new DSM item and returns the data_ptr from the new DSM item header to the requesting subsystem as shown in step 850. Similar to step 805, this process of returning a reference from the header of the new DSM item saves the overhead of creating a new DUP item. The requesting subsystem is given more than it asked for, an entire DSM item, and this allocation allows subsequent allocation requests to be satisfied with unallocated memory remaining in the current DSM item.

Returning to step 845, if the requested size is less than this second threshold, the method proceeds to step 855. In step 855 the DSM item header reference to the unallocated portion of the DSM payload is deleted. In effect, this frees up the remainder of the DSM item. In addition, a new DSM item is created. A block of memory in the new DSM item is allocated and a corresponding DUP created. The reference in the new DUP to the new DSM item is then returned to the requesting subsystem.

Figure 5:
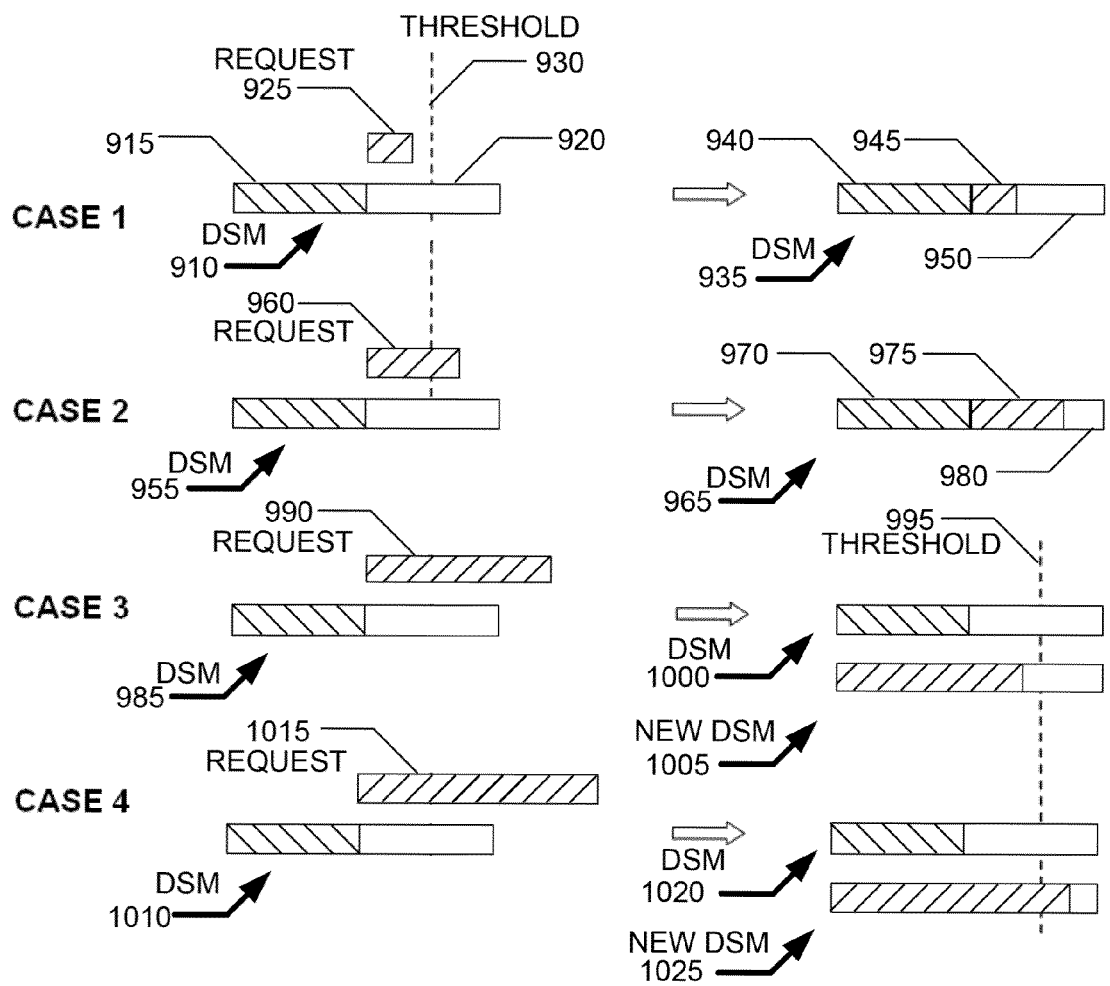
FIG. 5 is a block diagram illustrating various examples of the execution of a memory allocation service.

For the purpose of explanation, examples of the foregoing method are illustrated in FIG. 5. In CASE 1, a current DSM item 910 is illustrated. The current DSM has both an allocated portion 915 and an unallocated portion 920. A requested packet size 925 is illustrated as is the first threshold 930. As shown in the figure, the size of the allocated portion 915 plus the size of the requested portion 925 is less that the first threshold 930. Accordingly, as shown, a chunk of the DSM item 935, is allocated and a new DUP item is created and its reference returned to the calling subsystem. The new DUP item includes a reference to into DSM 935 that points to the start of the newly allocated data.

In CASE 2, a current DSM 955 is shown in conjunction with another requested packet 960. As illustrated in the figure, the size of the allocated portion of DSM 955 plus the size of the requested packet exceeds the first threshold, however, the sum does not exceed the total payload length. Accordingly, the reference to the unallocated portion of the DSM item 965 is returned to requesting subsystem. The result is that in addition to getting the requested memory size or even a slightly larger row adjusted allocation, the requesting subsystem will get all the remaining unallocated space 980 in the DSM 965. Again, returning the reference from the DSM item header saves the overhead of creating a DUP and eliminates the chaining potential created by the stub 980 that would have otherwise been left.

In CASE 3, a current DSM 985 is illustrated with another requested memory block 990. As illustrated, the requested packet is too large to fit in the unallocated portion of the current DSM. In addition, the requested size is less than the second threshold 995. Accordingly, the reference in the header of the current DSM 1000 to the unallocated portions of the payload is deleted. A new DSM 1005 is created. A block of the memory from that DSM is allocated and a new DUP item is created referencing the allocated block in the new DSM. The reference from this new DUP item is then returned to the requesting subsystem. Again, it will be appreciated that while the second threshold 995 is illustrated as being static, the threshold may be determined dynamically such as by setting it equal to the size of the allocated memory in the original.

In CASE 4, a current DSM 1010 is illustrated along with a requested memory block 1015. As with CASE 3, the requested size is too big to fit in the unallocated portion of DSM item 1010. In addition, the requested block size 1015 is greater than the second threshold 995. The result is that the current DSM 1020 is preserved in its current state. Meanwhile, a new DSM 1025 is created and the reference to the unallocated portion of the payload in the new DSM header is returned.

Figure 6:
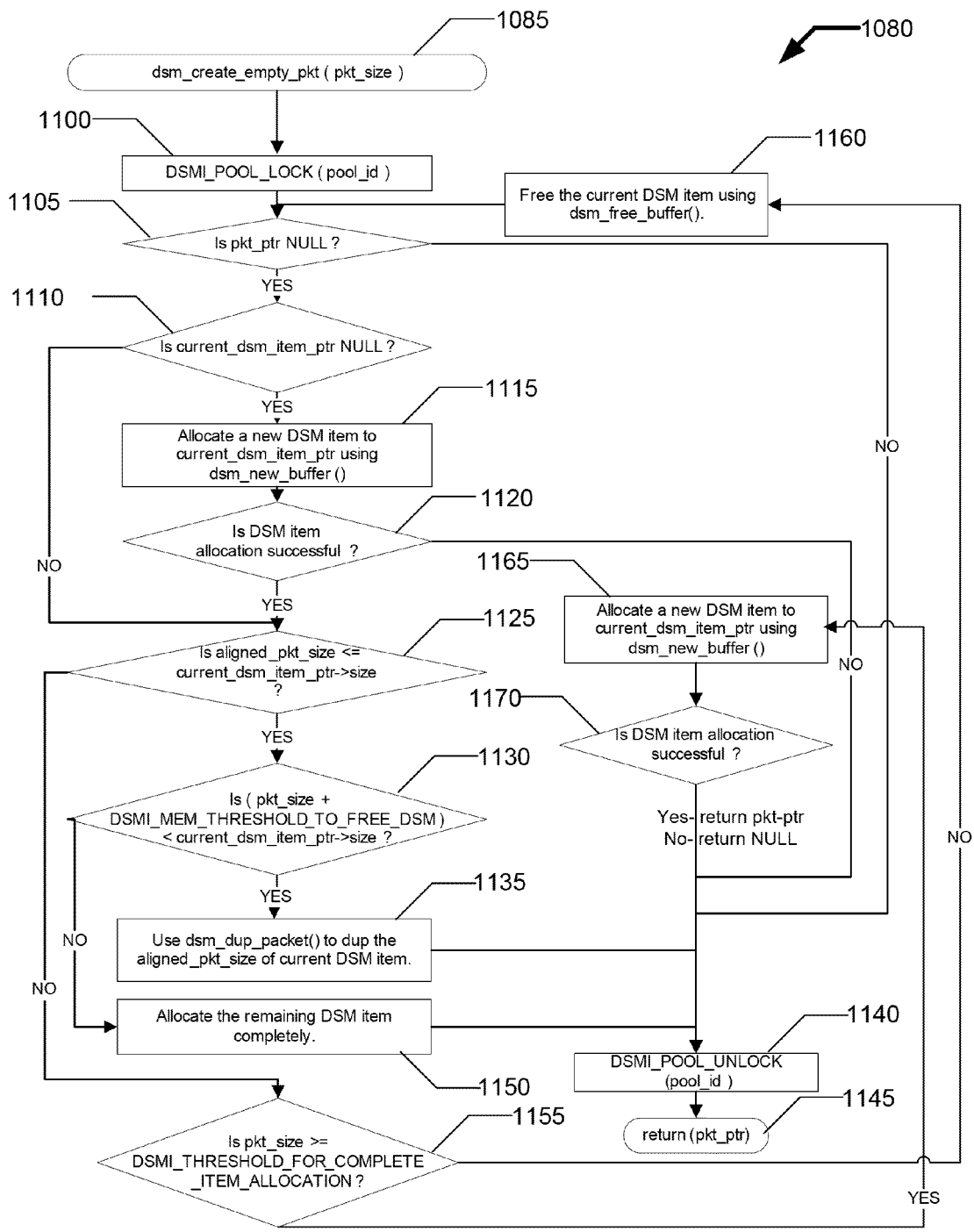
FIG. 6 is a block diagram illustrating another example of a method for allocating memory.

FIG. 6 is similar to the method illustrated in FIGS. 4A and 4B. However, FIG. 6 offers variations with respect to certain parameters used in one embodiment of the service for allocating memory. Method 1080, illustrated in FIG. 6, provides an API for memory allocation requests. In one particular embodiment, method 1080 provides a function call for subsystems which can be used to request memory allocation. As shown, the function may take as a parameter the requested size of the memory allocation. In addition, the function may take other parameters such as a subsystem ID which identifies the requesting subsystem. The service represented by FIG. 6 may be configured to run on a processor such as processor 202 of device 102. In response to the allocation requests, the service, as discussed below prepares a pointer to an allocated memory block of a size greater than or equal to the requested size. Accordingly, subsystems which use the service's API are returned a pointer to the allocated memory. In one particular embodiment, the method illustrated in FIG. 6 uses some or all the following values during its operation:

current_dsm_item_ptr[ ]: this is a set of pointers to the current DSM item for each subsystem.

aligned_pkt_size: the is the size of the requested block of memory, adjusted to align with cache rows of sizes such as 16, 32, 64, or 128.

pkt_ptr: pointer to the allocated memory that is going to be returned.

DSMI_MEM_THRESHOLD_TO_FREE_DSM: the first threshold for determining if a DUP or DSM reference should be returned. If after allocating a block of memory, the remaining unallocated memory would be less that this threshold, the DSM reference is returned, effectively allocating all remaining unallocated memory in the DSM item.

DSMI_THRESHOLD_FOR_COMPLETE_ITEM_ALLOCATION: the second threshold for determining whether a DUP or DSM reference should be returned. If the requested packet size is greater that this threshold, a new DSM item is created and the reference from the header of the new DSM is returned. The current DSM is retained.

The method illustrated in FIG. 6 begins with the function call shown at 1085. As a parameter to the request, the allocation service receives the requested packet size "pkt_size". In addition, in some embodiments, another parameter, the subsystem ID would also be passed to the function call. Proceeding to step 1100 the method locks the particular pool of DSM items to avoid concurrent access issues. After locking the pool, the method proceeds to decision step 1105. At decision step 1105 the service determines if the pkt_ptr is null. If no memory has been allocated for the request, the pointer may be null. However, if the pointer has a non NULL value, the service proceeds to unlock the pool 1140 and return the pointer 1145. However, if the pointer is null, the service proceeds to decision step 1110.

Continuing at decision step 1110, the service determines if the current_dsm_item_ptr is null. If previous iterations have resulted in no current DSM item existing, the service proceeds to create one 1115 and exit if such creation fails 1120, 1140, 1145. Once a valid current DSM is confirmed to exist or is created, the method proceeds to decision step 1125. At decision step 1125 the service determines if the aligned requested size is smaller than the size of the unallocated space in the current DSM. If it is, the service then determines if the unallocated space that would remain after allocating the requested memory in the DSM is smaller than a first threshold at step 1130. If so, the service creates a DUP and allocates the aligned requested memory in the current DSM 1135, unlocks the pool 1140, and returns the DUP pointer 1145. If not, the service creates an entirely new DSM 1150, unlocks the pool 1140, and returns the pointer from the header of the new DSM 1145.

Returning to step 1125, if the requested size is greater than the remaining unallocated space, the method proceeds to decision step 1155. At step 1155, the service determines if the requested size is greater than or equal to the second threshold. If so, the service creates an entirely new DSM 1165, unlocks the pool 1140, and returns the pointer from the header of the new DSM 1145. If not, the service frees the remaining memory in the current DSM and proceeds to start the method over again at step 1105. The result is that a new DSM is created, a DUP referencing the body of the new DSM is created and the DUP pointer is returned to the requesting subsystem.

Additional features and embodiments of the present memory allocation service are also presented herein:

Multiple DSM Pointers for Different Users

In order to handle cases where lifetime of data blocks is expected to differ substantially for different users, the algorithm may maintain multiple DSM pointers, and only pack data blocks with similar lifetime into the same DSM. For example, a user specific ID could be passed along with the allocation request, such that only data from this user would be packed into the same DSM item. Requests from other users would be packed into other DSMs. Here "user" can be, set of tasks or sub-tasks or layers or functions, or any other combination of these to distinguish one set of users profile from other.

Support for Adding Data in Front (or Back) of a DSM

In order to efficiently handle the addition of data in front of an existing DSM or DUP item (i.e. addition of protocol headers) without having to allocate a new DSM item and perform chaining, it is proposed to allow allocating a DSM with free space in the front. The free space is kept track of by an "offset" header. This way, a DUP or DSM can be allocated with a given offset, and later if more data needs to be inserted in the front of the DSM, this can be done without a new DSM allocation followed by chaining. Similar service could be allowed for adding data in the end of a DSM.

Multiple Pools

The service allows for multiple DSM pool to allow reservation of a given number of items to a certain user. This way that user will not have to worry that suddenly there are no more free DSM items because another user had allocated them all. Also, this provides better debug ability of memory overrun issues (where one user overrides the boundaries of an allocation), because the issue is restricted to the codebase of this user only.

Quota Service as Alternative to Multiple Pools

Another way of achieving the same is to have one pool, but each user has a max quota of DSM items (bytes) which he can allocate. Once he has reached his quota, he must free some items in order to allocate new items, to avoid memory starvation of other users. One benefit this has over the multiple pools approach is that sharing can still be achieved. For example if there are 4 users with their own pool of X items, it would require 4X items of memory. However since it is very unlikely that all 4 users would allocate all items at the same time, the quota service could allow to reduce the total memory to say 3X, assuming that if one user takes all his memory=X, the 3 remaining users would be able to share the remaining memory=2X.

Multiple DSM Pointers for Different Sizes

In this aspect, the DSM allocation may be partitioned based on the memory space requested (as opposed to using a subsystem ID above). Instead of having conventional way of multiple size pools shared across multiple layers/subsystems to satisfy needs of all the tasks/profiles, with this proposal there can be a provision to support multiple DSM pointers from which only specific size blocks can be allocated per DSM pointer. For example, we can have DSM pointer for 128, 256, 512, 768, 1024, 1536 byte block sizes and so on.

Whenever any layer/modules requests for the specific size memory, algorithm can determine the best fit DSM pointer and provide the dup if requested size is available. If requested size is not available then release DSM pointer (if not NULL) for that size and allocate a big item from global pool of big items (e.g., items greater than a predetermined number of bytes, in one example items greater than or equal to 768 bytes) and then DUP the best fit block size and return the DUP to the caller.

The present allocation also has several distinct advantages over the prior art. Embodiments of the present service reduces memory footprint. The use of fewer pools allows for better statistical multiplexing. The service facilitates better packing efficiency. There is less overhead for DSM items, even with the added overhead for DUPs. CPU processing overhead (MIPS) is reduced due to less chaining. The service allows for using larger DSM items avoiding long packet chains (especially at larger packet sizes) thereby reducing the number of DSM allocation/free operations. Embodiments simplify the maintenance associated with a more conventional approach involving multiple memory pools. The service may be implemented as having a central API for handling this avoids having to implement such functionality per subsystem, thereby duplicating code. The need for separate pool sizes and item sizes per target is avoided. Without the techniques outlined herein, one would need to implement code separately in many places (e.g., various or multiple layers in the stack, such as, packet services module (PS), high speed USB (HS-USB) module, etc.), which is more prone to errors, etc. It is Possible to define DUP pool in high speed memory for further performance improvements (e.g., cache benefits), for example, by defining the DUP pool in a low latency memory (e.g., internal random access memory (IRAM). Reduced checks in DSM can be obtained if only one pool is used with this application programming interface (API). Currently DSM performs some checks based on pool ID (identification) which is passed as a parameter.

What is claimed is:

1. A memory management system, comprising:
a processor; and
a memory management service, executable on the processor, the memory management service configurable to:
generate first memory items, wherein each of the first memory items comprises a header and a payload, the payload configured to store a plurality of independently allocable memory chunks, the header of the first memory items referencing unallocated space in the payload;
generate second memory items, wherein each of the second memory items comprises a header referencing one or more memory chunks in the payload of the first memory items; and
return a reference from either the header of a first or second memory item responsive to a memory allocation request.

2. The memory management system of claim 1, wherein the header of the first memory items maintains a count of references to the first memory items.

3. The memory management system of claim 1, wherein the memory management service is further configured to generate separate first memory items for each of a plurality of subsystems.

4. The memory management system of claim 1, wherein the memory allocation request comprises a requested memory size.

5. The memory management system of claim 4, wherein the memory management service is further configured to determine a sum of a size of allocated memory in a payload of a particular first memory item and the requested memory size, and compare the sum to a threshold value.

6. The memory management system of claim 5, wherein the memory management service is further configured to generate and return a reference from the header of a particular second memory item when the sum is less than the threshold value.

7. The memory management system of claim 6, wherein the memory management service is further configured to return a reference from the header of the particular first memory item when the sum is greater than the threshold value.

8. The memory management system of claim 4, wherein the memory management service is further configured to determine a sum of a size of allocated memory in a payload of a particular first memory item and the requested memory size, compare the sum to a size of the payload of the particular first memory item, and compare the requested memory size to a threshold.

9. The memory management system of claim 8, wherein the memory management service is further configured to generate another particular first memory item, generate a particular second memory item referencing a payload of the another particular first memory item, and return a reference from the header of the particular second memory item when the sum is greater than the size of the payload of the particular first memory item and the requested memory size is less than the threshold.

10. The memory management system of claim 8, wherein the memory management service is further configured to generate another particular first memory item and return a reference from the header of the another particular first memory item when the sum is greater than the size of the payload of the particular first memory item and the requested memory size is greater than the threshold.

11. The memory management system of claim 8, wherein the threshold is the size of allocated memory in the particular first memory item.

12. The memory management system of claim 4, wherein the memory management service is further configured to increase the requested memory size to align the requested memory size with a cache line boundary.

13. A method of memory management, the method comprising:
    allocating first memory items, the first memory items each comprising a first header and a payload, the payload comprising chunks of independently allocable memory, the first header comprising a reference to unallocated memory in the payload;
    allocating second memory items, the second memory items each comprising a second header, the second header comprising a reference to an allocated chunk of memory in the payload of a first memory item;
    receiving requests for memory allocation; and
    responding to requests for memory allocation by returning a reference from the header of a first or second memory item.

14. The method of claim 13, wherein the first header further comprises a count of references to the first memory items.

15. The method of claim 13, wherein the allocating first memory items further comprises allocating separate first memory items for each of a plurality of subsystems.

16. The method of claim 13, wherein the memory allocation request comprises a requested memory size.

17. The method of claim 16, further comprising determining a sum of a size of allocated memory in a payload of a particular first memory item and the requested memory size, and comparing the sum to a threshold value.

18. The method of claim 17, further comprising allocating and returning a reference from the header of a particular second memory item when the sum is less than the threshold value.

19. The method of claim 18, further comprising returning a reference from the header of the particular first memory item when the sum is greater than the threshold value.

20. The method of claim 16, further comprising:
    determining a sum of a size of allocated memory in a payload of a particular first memory item and the requested memory size;
    comparing the sum to a size of the payload of the particular first memory item; and
    comparing the requested memory size to a threshold.

21. The method of claim 20, further comprising:
    generating another particular first memory item;
    generating a particular second memory item referencing a payload of the another particular first memory item; and
    returning a reference from the header of the particular second memory item when the sum is greater than the size of the payload of the particular first memory item and the requested memory size is less than the threshold.

22. The method of claim 20, further comprising:
    generating another particular first memory item; and
    returning a reference from the header of the another particular first memory item when the sum is greater than the size of the payload of the particular first memory item and the requested memory size is greater than the threshold.

23. The method of claim 20, wherein the threshold is the size of allocated memory in the particular first memory item.

24. The method of claim 16, further comprising increasing the requested memory size to align the requested memory size with a cache line boundary.

25. A memory management system, comprising:
    means for allocating first memory items, the first memory items each comprising a first header and a payload, the payload comprising chunks of independently allocable memory, the first header comprising a reference to unallocated memory in the payload;
    means for allocating second memory items, the second memory items each comprising a second header, the second header comprising a reference to an allocated chunk of memory in the payload of a first memory item;
    means for receiving requests for memory allocation; and
    means for responding to requests for memory allocation by returning a reference from the header of a first or second memory item.

26. A non-transitory computer readable medium encoded with computer instructions which, when executed, cause a processor to:
    allocate first memory items, the first memory items each comprising a first header and a payload, the payload comprising chunks of independently allocable memory, the first header comprising a reference to unallocated memory in the payload;
    allocate second memory items, the second memory items each comprising a second header, the second header comprising a reference to an allocated chunk of memory in the payload of a first memory item;
    receive requests for memory allocation; and
    respond to requests for memory allocation by returning a reference from the header of a first or second memory item.

* * * * *